R. GLASER.
COMBINED FOUNTAIN AND AQUARIUM.
APPLICATION FILED SEPT. 17, 1908.

919,157.

Patented Apr. 20, 1909.

Witnesses
F. B. Roy.
M. Held

Inventor
Rudolph Glaser
by his Attorney
Clarence Galston

UNITED STATES PATENT OFFICE.

RUDOLPH GLASER, OF NEW YORK, N. Y.

COMBINED FOUNTAIN AND AQUARIUM.

No. 919,157.

Specification of Letters Patent.

Patented April 20, 1909.

Application filed September 17, 1908. Serial No. 453,524.

*To all whom it may concern:*

Be it known that I, RUDOLPH GLASER, a citizen of the United States, residing in New York city, in the county and State of New York, have invented an Improvement in a Combined Fountain and Aquarium, of which the following is a specification.

My invention relates to a combined fountain and aquarium, and the object of the invention is to produce a device of this character which is simple in construction and which will permit the production of novel and pleasing effects by the use of electric lights or other means of illumination.

To the foregoing ends, my invention consists in the combined fountain and aquarium hereinafter described, as defined in the succeeding claims.

Figure 1:
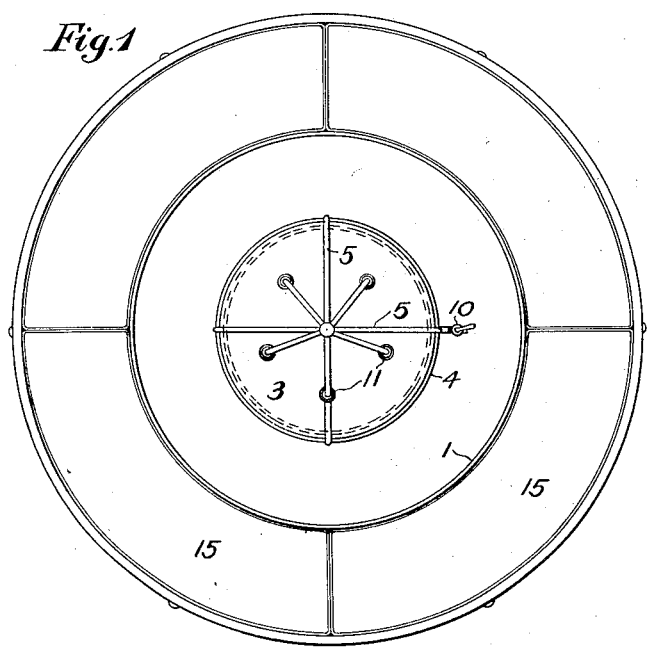
Figure 2:
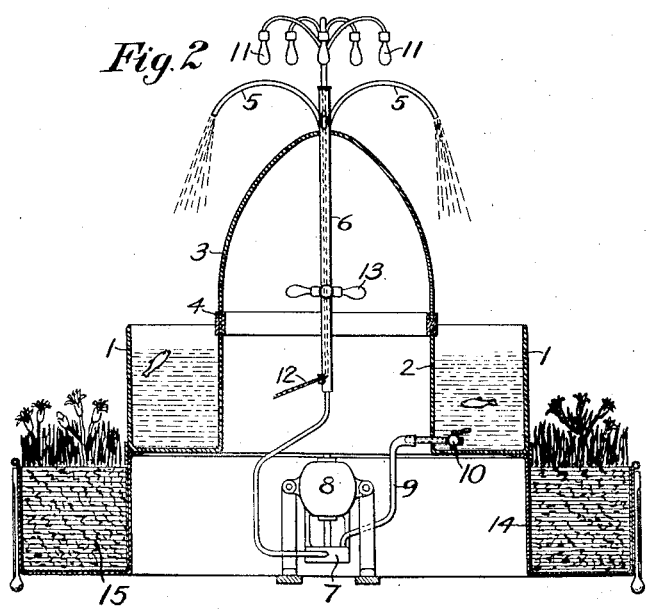

In the accompanying drawings, Figure 1 is a plan view of a device embodying the present invention, and Fig. 2 is a vertical section thereof.

In the illustrated embodiment of my invention the aquarium consists of a glass vessel of an annular form, having a circular outer wall 1 and an inner wall 2 of similar form. The aquarium is therefore susceptible of illumination by lights placed within its central opening, while the space between the walls 1 and 2 may be filled with water containing marine animals and plants. The central opening of the aquarium is covered by a dome-shaped cover 3 of glass or other translucent material, preferably colored, and the cover and the wall 2 are securely connected by means of a grooved collar 4 at their juncture.

The fountain comprises a number of arms 5 springing from a riser pipe 6 which projects from the top of the cover 3. The arms 5 constitute nozzles from which the water is delivered in jets which fall upon the cover 3 and into the aquarium. The water by which the fountain is supplied is drawn from the aquarium and is raised to the fountain by a rotary pump 7 beneath the aquarium. The pump is driven by an electric motor 8 and is supplied from the aquarium through an inlet pipe 9 controlled by a valve 10. By means of this valve the amount of water issuing from the fountain may be conveniently regulated.

The ornamental appearance of the structure above described is greatly enhanced by the use of electric lights or other means of illumination. For this purpose a number of electric lights 11 are arranged just above the fountain, and they serve to illuminate the falling jets of water and the cover 3 and the aquarium. To further enhance the effect by illuminating the structure from the interior, electric lamps 13 are mounted upon the riser pipe 6. The light from these lamps shines through the inner wall of the aquarium and illuminates the contents of the aquarium in a novel and effective manner, and the light also shines through the cover 3 and the water trickling over it. The electric lamps 11 and 13 are connected with a suitable source of electricity by wires 12 passing through the riser pipe 6. The motor 8 may also be energized from the same source.

The aquarium is supported on a hollow stand 14 which serves as a casing for the pump and the motor, and this stand is also formed to contain curved plant boxes or ferneries 15 surrounding the aquarium.

Various modifications may be made in the details of form and structure of the illustrated embodiment of my invention within the nature of the invention and the scope of the following claims.

I claim:

1. In a combined fountain and aquarium, the combination of a base having a power chamber therein, a water-containing receptacle made from translucent material and mounted on said base and communicating therewith, a translucent dome-shaped member mounted in said water-containing receptacle, water conducting means extending from the water-containing receptacle through the power chamber and the dome-shaped member, and illuminating means located within and above said dome-shaped member, for the purposes set forth.

2. In a combined fountain and aquarium, the combination of a base having a power chamber therein, a water-containing receptacle made from translucent material and mounted on said base and communicating therewith, a translucent dome-shaped member mounted in said water-containing receptacle, water conducting means extending from the water-containing receptacle through the power chamber and the dome-shaped member, illuminating means located within and above said dome-shaped member, and means located in the power chamber to draw the water from the water-containing receptacle and to raise the same to a point of discharge above said dome.

3. In a combined fountain and aquarium, the combination of a base having a power chamber therein, a water-containing receptacle made from translucent material and mounted on said base and communicating therewith, a translucent dome-shaped member mounted in said water-containing receptacle, water conducting means extending from the water - containing receptacle through the power chamber and the dome-shaped member, illuminating means located within and above said dome-shaped member, and a plant-containing receptacle surrounding the base portion of the structure.

RUDOLPH GLASER.

Witnesses:
CLARENCE G. GATSTOR,
FLORENCE B. ROY.